(12) United States Patent
Chen et al.

(10) Patent No.: US 7,059,576 B2
(45) Date of Patent: Jun. 13, 2006

(54) PORTABLE COMPUTER SUPPORT STRUCTURE

(75) Inventors: Ching-Jou Chen, Taipei (TW); Chao-Ming Huang, Taipei (TW); Kao-Wen Chang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 183 days.

(21) Appl. No.: 10/799,624

(22) Filed: Mar. 15, 2004

(65) Prior Publication Data

US 2005/0139740 A1    Jun. 30, 2005

(30) Foreign Application Priority Data

Dec. 31, 2003 (TW) .............................. 92223093 U

(51) Int. Cl.
*A47G 1/24* (2006.01)
*A47B 97/04* (2006.01)
(52) U.S. Cl. ................. 248/371; 248/455; 248/457; 248/465; 248/923
(58) Field of Classification Search ............... 248/454, 248/455, 456, 457, 460, 465, 371, 917, 919, 248/923
See application file for complete search history.

(56) References Cited

U.S. PATENT DOCUMENTS

| 681,976 | A | * | 9/1901 | Rathvon | 248/456 |
| 4,044,980 | A | * | 8/1977 | Cummins | 248/456 |
| 4,440,373 | A | * | 4/1984 | Beitler et al. | 248/461 |
| 4,522,364 | A | * | 6/1985 | Charney et al. | 248/460 |
| 4,886,231 | A | * | 12/1989 | Doerksen | 248/455 |
| 6,045,108 | A | * | 4/2000 | Cziraky | 248/454 |
| 6,216,316 | B1 | * | 4/2001 | Errichiello | 16/246 |
| 6,679,468 | B1 | * | 1/2004 | Hsu | 248/454 |
| 2003/0019996 | A1 | * | 1/2003 | Shields | 248/454 |
| 2003/0213886 | A1 | * | 11/2003 | Gilbert | 248/454 |

* cited by examiner

*Primary Examiner*—Jonathon Szumny
(74) *Attorney, Agent, or Firm*—Bacon & Thomas, PLLC

(57) ABSTRACT

A portable computer support structure is constructed to include a base member, a support arm fastened pivotally with the base member, a back-stick plate pivoted to the base member and adapted to adjustably support the support arm above the base member in a standing position, a step-less pivoting device affixed to the top side of the support arm and holding a step-less shaft, and a support block fastened to the step-less shaft and adapted to support a portable computer for enabling the portable computer to be rotated with the step-less shaft relative to the support arm to adjust the view angle and to prevent the problem of reflection of light of the display screen.

4 Claims, 5 Drawing Sheets

PORTABLE COMPUTER SUPPORT STRUCTURE

BACKGROUND OF THE INVENTION

1. Field of the Invention

The present invention relates to a portable computer support structure and more particularly, to such a portable computer support structure, which is practical in use to support a portable computer, enabling the portable computer to be adjusted to the desired a standing operative angle.

2. Description of Related Art

In order to support a portable computer, for example, a tablet PC in a standing position for operation, a support structure may be used to support the portable computer in position.

However, a conventional portable computer support structure is simply adapted to support the portable computer in the standing position, not adjustable to change the standing angle of the portable computer. Because this design of portable computer support structure is not adjustable, it does not fit different users of different body heights. Further, this limitation causes a number of problems as excessively high or low view angle, reflection of the light of the display screen, etc., resulting in inconvenience use of the portable computer.

Therefore, it is desirable to provide a portable computer support structure that eliminates the aforesaid drawbacks.

SUMMARY OF THE INVENTION

The present invention has been accomplished under the circumstances in view. It is the main object of the present invention to provide a portable computer support structure, which can conveniently be controlled to adjust the angle of the tablet PC supported thereon subject to the user's body height, giving convenience of use.

To achieve this and other objects of the present invention, the portable computer support structure is adapted to support a portable computer that comprises a supporting portion at the back side thereof. The portable computer support structure is comprised of a base member, a support arm, a back-stick plate, a step-less pivoting device, and a support block.

The base member comprises a first pivoting structure disposed at a top surface near the rear side of the base member, and a second pivoting structure disposed at the top surface in front of the first pivoting structure. The support arm has a bottom pivoting portion disposed at the bottom side and locating means disposed at the top side thereof. The bottom pivoting portion is fastened pivotally with the first pivoting structure of the base member for enabling the support arm to be rotated relative to and lifted from the base member. The back-stick plate has a bottom side and a top side. The bottom side of the back-stick plate is pivoted to the second pivoting structure of the base member for enabling the back-stick plate to be rotated relative to and lifted from the base member to let the support arm be supported on the top side of the back-stick plate after lifting of the support arm from the base member. The step-less pivoting device comprises a base affixed to the locating means of the support arm, and a step-less shaft inserted through and rotatable step-lessly relative to the base of the step-less pivoting device. The support block is adapted to support the portable computer on the support arm, comprising a mounting portion fastened to the step-less shaft of the step-less pivoting device, and a coupling portion connectable to the supporting portion of the portable computer.

When in use, the user can freely adjust the angle of inclination of the portable computer to the best view angle subject to the user's body height by using the step-less shaft of the step-less pivoting device, eliminating the problem of reflection of light of the display screen. And the portable computer can be held in the desired angular position for convenience of use.

DETAILED DESCRIPTION OF THE PREFERRED EMBODIMENT

Figure 1:
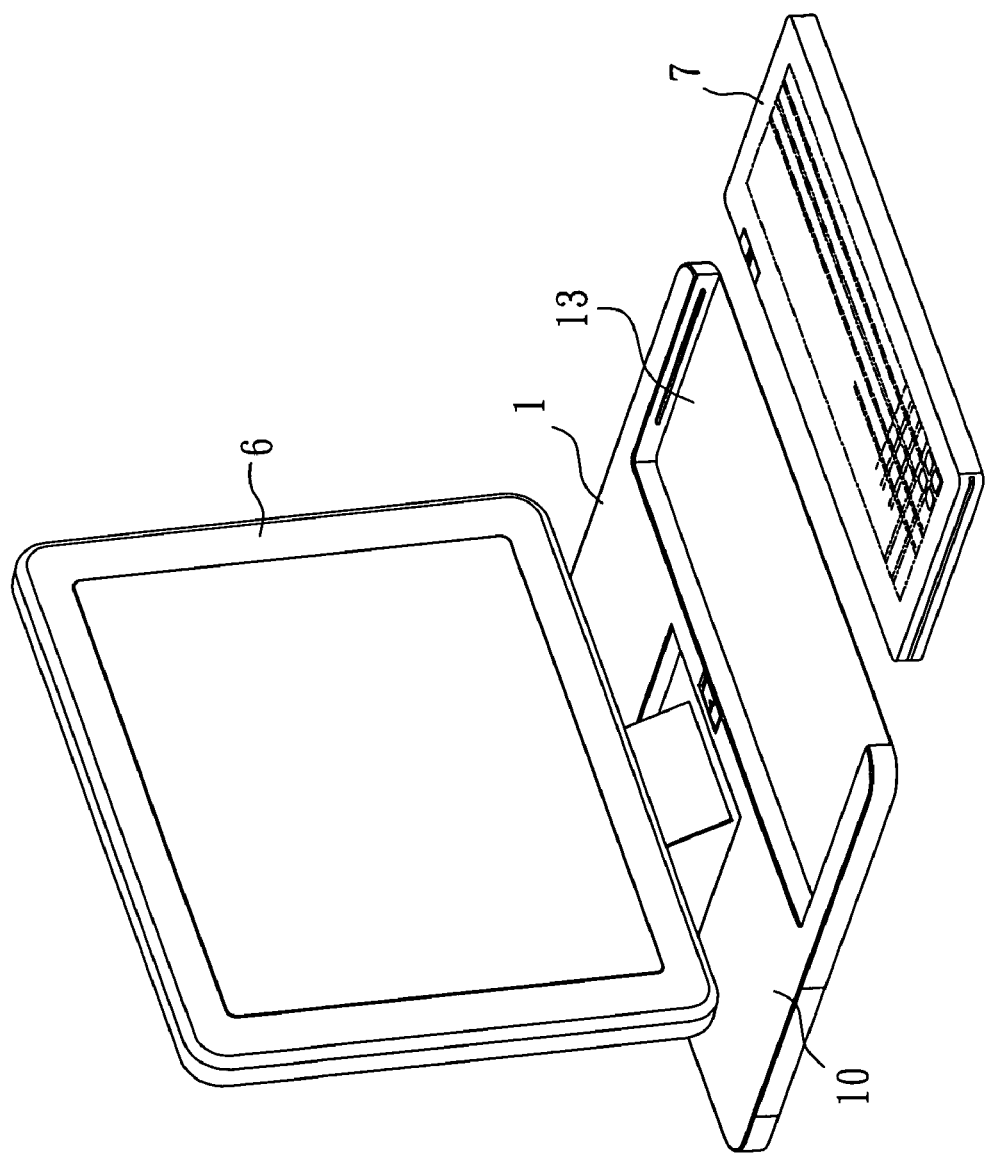
FIG. 1 is a schematic drawing showing an application example of a portable computer support structure according to the present invention.

Referring to FIG. 1, a portable computer support structure in accordance with the present invention is shown comprised of a base member 1 and a portable computer 6 supportable on the base member 1. The portable computer 6 according to the present preferred embodiment is a tablet PC. The base member 1 has a receiving open chamber 13, which accommodates an input device, for example, a keyboard 7.

Figure 2:
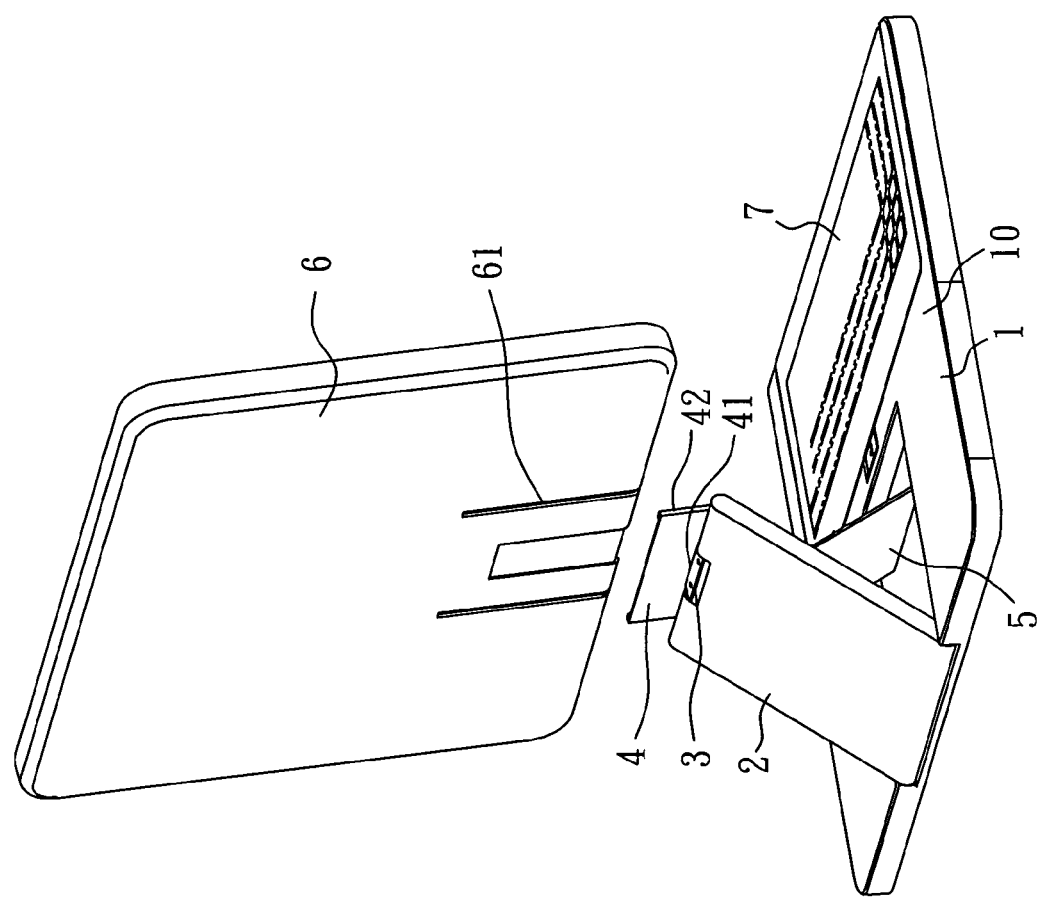
FIG. 2 is a schematic drawing of the present invention before connection of the portable computer to the support block.
Figure 3:
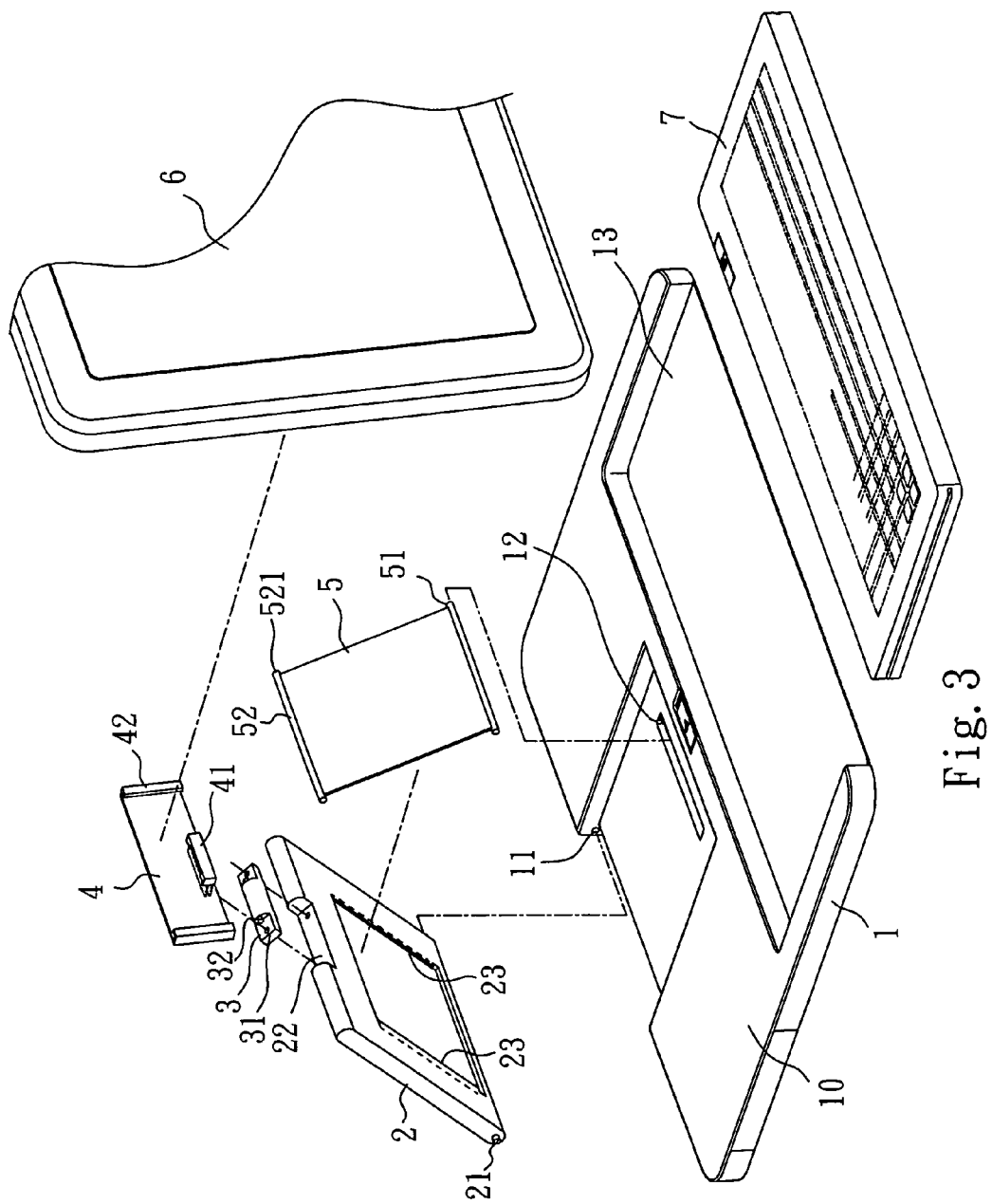
FIG. 3 is an exploded view of the portable computer support structure according to the present invention.

Referring to FIGS. 2 and 3 and FIG. 1 again, the portable computer 6 comprises a pair of sliding grooves disposed at the back surface, forming a supporting portion 61. The portable computer support structure further comprises a support arm 2, a back-stick plate 5, a step-less pivoting device 3, and a support block 4.

The base member 1 has provided at the top surface 10 a first pivoting structure 11 near the rear side of the base member 1 and a second pivoting structure 12 in front of the first pivoting structure 11. The support arm 2 has a bottom pivoting portion 21 at the bottom side thereof and a recessed locating portion 22 at the top side thereof. The bottom pivoting portion 21 is fastened pivotally with the first pivoting structure 11 of the base member 1 for enabling the support arm 2 to be rotated relative to and lifted from the base member 1. The support arm 2 further comprises two parallel sliding grooves 23.

The back-stick plate 5 has the bottom side 51 pivoted to the second pivoting structure 12 of the base member 1 for enabling the back-stick plate 5 to be rotated relative to and lifted from the base member 1, and a top side 52 terminating in a coupling flange 521, which is coupled to and slidable along the sliding grooves 23 of the support arm 2. When lifted the support arm 2 and the back-stick plate 5 from the base member 1, the coupling between the sliding grooves 23 and the coupling flange 521 enables the support arm 2 to be supported on the top side 52 of the back-stick plate 5.

The step-less pivoting device 3 comprises a base 31 and a step-less shaft 32. The base 31 is affixed to the recessed locating portion 22 of the support arm 2. The step-less shaft 32 is inserted through and rotatable step-lessly relative to the base 31 of the step-less pivoting device. The support block 4 comprises a mounting portion 41 fastened to the step-less shaft 32 of the step-less pivoting device 3, and a pair of sliding rails of L-shaped cross section forming a coupling portion 42 that is coupled to the supporting portion 61 of the portable computer 6. After connection of the supporting portion 61 of the portable computer 6 to the coupling portion 42 of the support block 4, the portable computer 6 can be rotated with the support block 4 and the step-less shaft 32 relative to the base 31 and the support arm 2 steplessly. The sliding rails of L-shaped cross section of the coupling portion 42 may be arranged facing each other or reversed to each other. Alternatively, the sliding rails of the coupling portion 42 can be made having a T-shaped cross section.

When in use, the portable computer 6 is coupled to the support block 4 at the top side of the support arm 2, and rotated with the support block 4 and the step-less shaft 32 relative to the base 31 and the support arm 2 to the desired angle of inclination subject to the user's body height, i.e., the user can freely adjust the angle of inclination of the portable computer 6 to the best view angle, eliminating the problem of reflection of light of the display screen. Therefore, the portable computer 6 can be held in the desired angular position for convenience of use.

Figure 4:
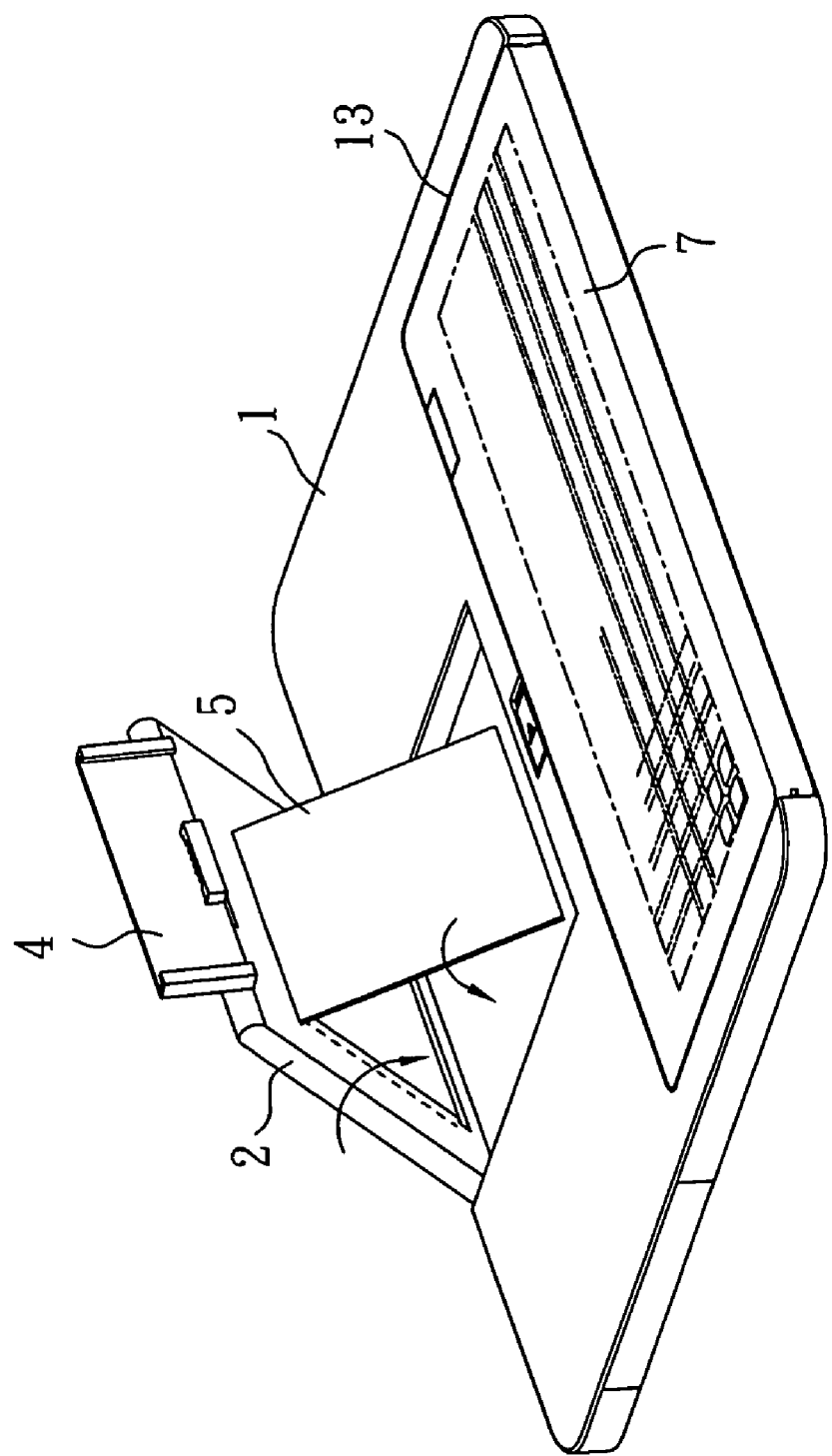
FIG. 4 is a schematic drawing showing the receiving action of the portable computer support structure after removal of the portable computer from the support block.
Figure 5:
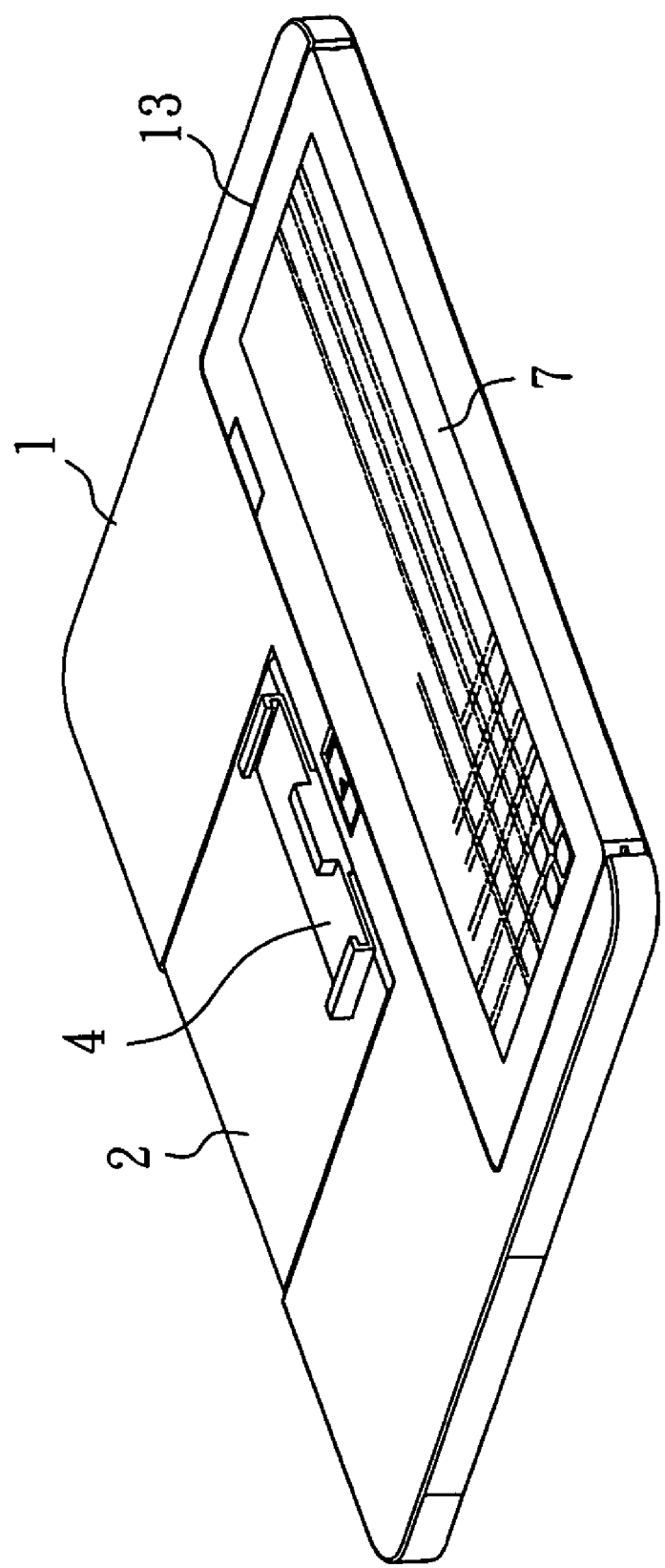
FIG. 5 is a schematic drawing of the present invention showing the received status of the portable computer support structure.

Referring to FIGS. 4 and 5 and FIG. 1 again, after use, the portable computer 6 is removed from the support block 4, and then the back-stick plate 5 and the support arm 2 are respectively rotated downwardly inwards and received to the base member 1, and then the keyboard 7 is received inside the recessed receiving open chamber 13 of the base member 1. FIG. 5 shows the portable computer support structure set in the received status.

Although the present invention has been explained in relation to its preferred embodiment, it is to be understood that many other possible modifications and variations can be made without departing from the spirit and scope of the invention as hereinafter claimed.

What is claimed is:

1. A portable computer support structure adapted to support a portable computer that comprises a supporting portion at a back side thereof, the portable computer support structure comprising:
   a base member, said base member comprising a first pivoting structure disposed at a top surface thereof near a rear side of said base member, and a second pivoting structure disposed at said top surface in front of said first pivoting structure;
   a support arm, said support arm having a bottom pivoting portion disposed at a bottom side thereof and locating means disposed at a top side thereof, said bottom pivoting portion being fastened pivotally with the first pivoting structure of said base member for enabling said support arm to be rotated relative to and lifted from said base member;
   a back-stick plate, said back-stick plate having a bottom side and a top side, the bottom side of said back-stick plate being pivoted to the second pivoting structure of said base member for enabling said back-stick plate to be rotated relative to and lifted from said base member to let said support arm be supported on the top side of said back-stick plate after lifting of said support arm from said base member;
   a step-less pivoting device, said step-less pivoting device comprising a base affixed to the locating means of said support arm, and a step-less shaft inserted through and rotatable step-lessly relative to the base of said step-less pivoting device; and
   a support block, said support block comprising a mounting portion fastened to the step-less shaft of said step-less pivoting device, and a coupling portion connectable to the supporting portion of said portable computer,
   wherein the coupling portion of said support block is comprised of a pair of sliding rails adapted to be respectively coupled to a pair of sliding grooves that form the supporting portion of said portable computer, wherein said sliding rails have an L-shaped cross section.

2. The portable computer support structure as claimed in claim 1, wherein said portable computer support structure is adapted to support a tablet PC.

3. The portable computer support structure as claimed in claim 1, wherein the locating means of said support arm is comprised of a recessed portion.

4. A portable computer support structure adapted to support a portable computer that comprises a supporting portion at a back side thereof, the portable computer support structure comprising:
   a base member, said base member comprising a first pivoting structure disposed at a top surface thereof near a rear side of said base member, and a second pivoting structure disposed at said top surface in front of said first pivoting structure;
   a support arm, said support arm having a bottom pivoting portion disposed at a bottom side thereof and locating means disposed at a top side thereof, said bottom pivoting portion being fastened pivotally with the first pivoting structure of said base member for enabling said support arm to be rotated relative to and lifted from said base member;
   a back-stick plate, said back-stick plate having a bottom side and a top side, the bottom side of said back-stick plate being pivoted to the second pivoting structure of said base member for enabling said back-stick plate to be rotated relative to and lifted from said base member to let said support arm be supported on the top side of said back-stick plate after lifting of said support arm from said base member;
   a step-less pivoting device, said step-less pivoting device comprising a base affixed to the locating means of said support arm, and a step-less shaft inserted through and rotatable step-lessly relative to the base of said step-less pivoting device; and
   a support block, said support block comprising a mounting portion fastened to the step-less shaft of said step-less pivoting device, and a coupling portion connectable to the supporting portion of said portable computer, wherein said support arm comprises at least one sliding groove; and said back-stick plate comprises a coupling flange coupled to the at least one sliding groove of said support arm.

* * * * *